April 8, 1969     J. E. WEIMHOLT     3,437,035
METHOD AND APPARATUS FOR DISSEMINATING FLUID
FROM VEHICLE IN FLIGHT
Filed Oct. 5, 1965
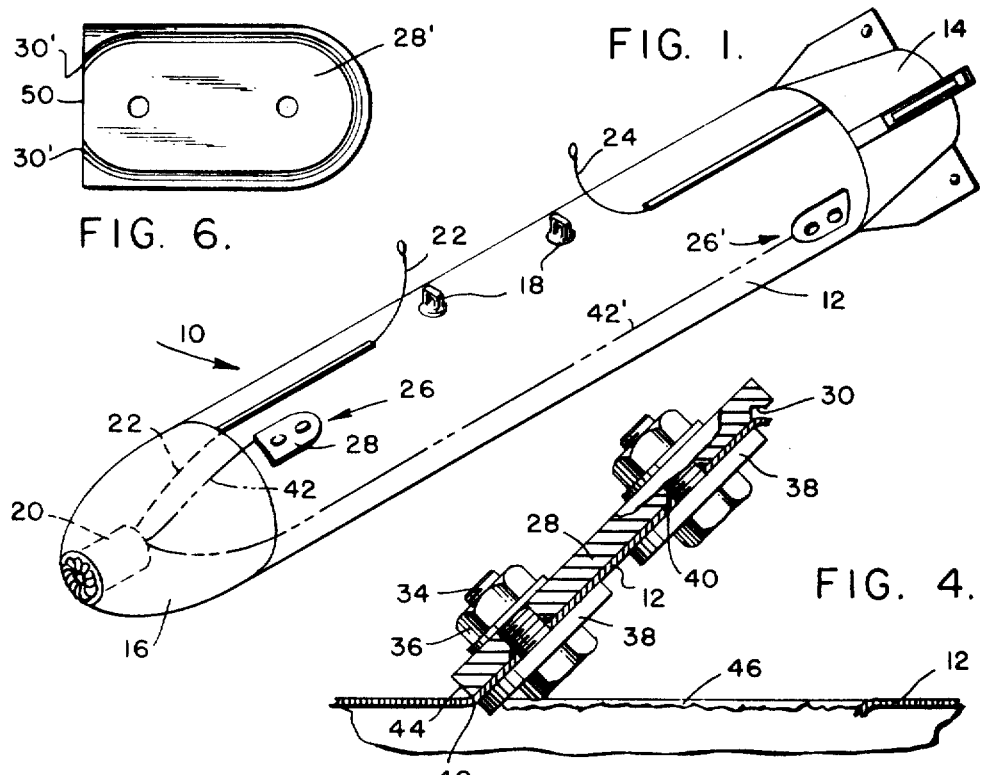
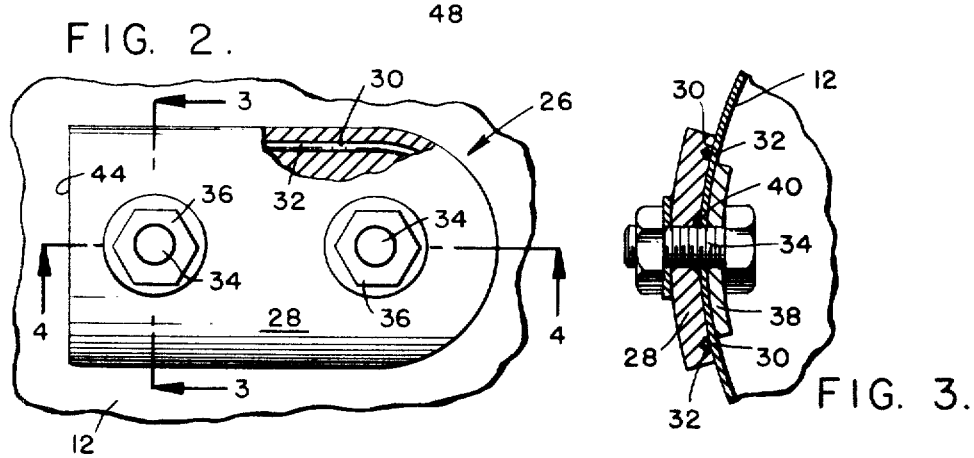
INVENTOR.
JAMES E. WEIMHOLT
BY
P. H. Firth
ATTORNEY.

United States Patent Office 3,437,035
Patented Apr. 8, 1969

3,437,035
METHOD AND APPARATUS FOR DISSEMINATING FLUID FROM VEHICLE IN FLIGHT
James E. Weimholt, China Lake, Calif., assignor to the United States of America as represented by the Secretary of the Navy
Filed Oct. 5, 1965, Ser. No. 493,286
Int. Cl. F42b 25/12
U.S. Cl. 102—6         5 Claims

ABSTRACT OF THE DISCLOSURE

Aircraft launched chemical container in which dispensing openings are formed after launching by explosively cutting the openings in the wall of the container.

---

The invention described herein may be manufactured and used by or for the Government of the United States of America for governmental purposes without the payment of any royalties thereon or therefor.

The present invention relates to a method and apparatus for disseminating fluid from a vehicle in flight and more particularly to means for forming disseminating openings in the body of a hermetically sealed container of a chemical munition during flight thereof after launch from an aircraft.

The dissemination of chemical agents from aircraft is commonly by any of the methods hereinafter described. Explosive dissemination is frequently used when small particle or aerosol generation is desirable or acceptable. In this method, an explosive is used to rupture a container and disperse a liquid agent. Since agent flashing or burning is often encountered when highly volatile materials are dispersed, explosive dissemination is usually confined to chemicals of low volatility. A further limitation is that the area initially covered is small. In another method, the container is ruptured upon impact with the ground and the liquid chemical splashes out. This method has found little application in chemical munitions because of the very small area coverage obtained. A method where the chemical agent is sprayed from tanks carried by the aircraft has proven successful in some applications. However, in the case of highly toxic agents there is a serious contamination hazard to the aircraft and pilot and a danger to the safety of personnel loading, servicing and maintaining the aircraft and the tanks. Although good control of the spray may be achieved, there is a lack of flexibility in tactical employment of the chemical agent because the height of the spray must be adjusted in accordance with meteorological conditions for maximum effectiveness which in many situations may require flying at very low altitude with attendant danger to the safety of the pilot and aircraft.

It is therefore a purpose and object of this invention to provide a chemical dissemination system which overcomes the disadvantages and limitations inherent in the methods hereinbefore discussed.

Another object is the provision of a dissemination system in which liquid agent is hermetically sealed until the time of dissemination in flight.

A further object is to provide a chemical munition in which a liquid agent is confined in a leakproof container and has means for forming disseminating openings in the container after launch thereof from an aircraft.

Other objects, advantages and novel features of the invention will become apparent from the following detailed description of the invention when considered in conjunction with the accompanying drawings wherein:

FIG. 1 is a schematic perspective view of a chemical munition to which the dissemination system of the instant invention is applied;

FIG. 2 is a fragmentary plan view, on a larger scale, of a portion of FIG. 1 showing a backup plate and groove therein which houses a flexible linear shaped charge;

FIG. 3 is a cross sectional view taken generally along line 3—3 of FIG. 2;

FIG. 4 is a cross sectional view taken generally along line 4—4 of FIG. 2 but showing the position of the backup plate after the shaped charge has been detonated and a disseminating opening has been formed;

FIG. 5 is a fragmentary perspective view of a portion of FIG. 1 showing the disseminating opening more clearly; and FIG. 6 is a plan view of the underside of a modified backup plate.

Referring now to the drawings, there is shown schematically in FIG. 1 a chemical munition designated generally by reference numeral 10 and comprising a casing or container 12, a folding fin assembly 14, a nose fairing 16 and supporting lugs 18 by which the munition is supported from a launcher on an aircraft in a conventional manner. The fin assembly 14 may be of the type described and claimed in application Ser. No. 490,143, filed Sept. 24, 1965, Patent No. 3,304,030, by James E. Weimholt et al., and the fins thereof may be canted to provide spin to munition 10 after release. The nose fairing 16 contains an air-armed fuze 20 of conventional type which is initiated by withdrawal of an arming wire 22 suitably connected to the aircraft, a similar wire 24 serving to initiate release of the folded fins in fin assembly 14 after launch of the munition.

Casing 12 is of welded construction to provide a leakproof container for a liquid chemical (not shown). In order to disseminate the liquid chemical in flight after launch, there are provided, at the forward end of the casing, explosively actuated means 26, shown in greater detail in FIGS. 2–4.

Means 26 comprise a backup plate 28 formed with a U-shaped groove 30 in the underside thereof, which groove houses a flexible linear shaped charge 32. Shaped charges of the type just referred to are conventional and well known in the art as exemplified by the patent to Parkhurst et al., 3,185,089. Plate 28 is curved to fit the container 12 and is held thereagainst by means of a pair of bolts 34 and nuts 36, each bolt passing through a washer 38 and casing 12 and welded to the casing, as at 40. Shaped charge 32 is connected to fuze 20 by any suitable firing train 42, for example, by means of primer cord and a detonator at one end of the charge.

It is to be noted that the ends of the U-shaped groove 30 terminate at the straight end 44 of backup plate 28, whereby a U-shaped cut is formed in container 12 upon detonation of the shaped charge 32 in the groove. Additionally, with detonation of the charge 32 there is a reaction which lifts the plate 28 away from the container 12 to form a disseminating opening or port 46, FIGS. 4 and 5, the portion of the container between the ends of the U-shaped cut bending and acting as a hinge 48.

Where the diameter of the container 12 is relatively large and the degree of curvature of the backup plate 28 is small, the reaction to the detonation of charge 32 is sufficient to effect bending of the hinge 48. However, when the diameter of the container is small, difficulty may be encountered in effecting the bend due to the greater degree of curvature of the container. In this case, it is desirable to use a modified backup plate 28', FIG. 6, in which the ends 30' of the U-shaped groove are curved and brought closer together to a shorter or narrower end 50 with the result that the portion of the container between the groove ends is shorter and bending thereof more easily effected.

Means 26', similar to means 26 but oppositely oriented, are provided at the rear end of the casing 12 and are adapted to be explosively actuated by fuze 20 through the medium of any suitable firing train 42'.

It will be appreciated that a plurality of means 26 and 26' may be arranged on container 12 in order that the liquid agent may be disseminated more rapidly, if desired.

In operation, the munition 10 is launched and as the munition falls away from the aircraft arming wires 22 and 24 are pulled for initiating fuze 20 and release of the folded fins in assembly 14. Fuze 20 is provided with a predetermined time delay at the end of which the firing trains 42, 42' are ignited to detonate the shaped charges of means 26 and 26' and form openings or ports in container 12 adjacent to the forward and rear ends thereof. The backup plate of means 26 in its lifted position acts as a wind screen to suck the liquid agent out of the container, the backup plate of means 26' in its lifted position acting as an air scoop to force air into the container and pressurize the same, thus disseminating the agent.

There has thus been provided a method and means for readily disseminating in flight a liquid agent which is contained in a leakproof container.

What is claimed is:

1. Apparatus for disseminating fluid from a container in flight; comprising:
   (a) a sealed casing for containing the fluid and having a wall of material sufficiently malleable to bend without rupture,
   (b) a plate having a face of a shape to conform to the shape of the container and secured to the outside surface of same,
   (c) said plate having a groove in said face adjacent its edge containing a flexible linear shaped charge,
   (d) said groove and shaped charge extending only partially around the periphrey of the plate, the charge adapted, when detonated, to sever the wall of the container only adjacent the charge,
   (e) the wall of the container, in the locus of the plate wherein no line charge is contained, adapted to serve as a hinge and permit the severed portion of the wall of the container to bend and swing outwardly from the container to provide an opening therein.

2. Apparatus in accordance with claim 1 wherein said plate has a straight edge joining the ends of the shaped charge, whereby the wall of the container bends along a straight line.

3. Apparatus in accordance with claim 2 wherein the edge of the plate, opposite said straight edge, is curved through an angle of substantially 180° to thereby produce a U-shaped opening in the container.

4. Apparatus in accordance with claim 3 wherein said groove and shaped charge extend inwardly from the edge of the plate, adjacent said straight edge, to provide a hinge of less length than the length of said straight edge.

5. Apparatus in accordance with claim 1 wherein the line charge and container are so proportioned to cause the plate and severed portion of the container to swing outward to an angle to provide a windscreen over the opening, and a like plate and line charge secured to the container and so oriented to provide an air scoop over an opening, the air scoop adapted to receive ram air for pressurizing the container and expelling its contents through the opening beneath the windscreen.

References Cited

UNITED STATES PATENTS

| | | | |
|---|---|---|---|
| 2,653,541 | 9/1953 | Kanode et al. | 102—6 |
| 3,191,533 | 6/1965 | Hopson | 102—24 |
| 3,220,674 | 11/1965 | Ordemann et al. | 244—136 |
| 3,248,072 | 4/1966 | Schimmel | 102—24 |
| 3,267,662 | 8/1966 | Miller | 220—47 X |
| 3,185,089 | 5/1965 | Parkhurst et al. | 102—24 |

FOREIGN PATENTS

| | | |
|---|---|---|
| 65,921 | 8/1951 | Great Britain. |

ROBERT F. STAHL, *Primary Examiner.*

U.S. Cl. X.R.

244—136; 220—47, 89